Inventor
LEONARD C. BROSE

Patented Mar. 26, 1946

2,397,238

UNITED STATES PATENT OFFICE 2,397,238

WING NUT

Leonard Carl Brose, Burbank, Calif., assignor to Adel Precision Products Corp., a corporation of California Application November 29, 1944, Serial No. 565,717

3 Claims. (Cl. 85—36)

This invention relates to improvements in self-locking spring nuts of the type in which a sheet metal body portion is provided with resilient members having opposed edges for threadedly engaging a bolt or like fastening so as to lock the nut thereon.

An object of this invention is to provide a wing nut on which a sheet metal body portion, resilient bolt-engaging portions formed integral therewith, and wings likewise formed integral with the body portion, are constructed and relatively arranged so that the locking action of said bolt-engaging portions is made more reliable and effective, the nut is strengthened and reinforced as a whole, and the entire nut is tensioned and exerts forces which aid in the locking of the nut on the bolt.

Another object of my invention is to provide a wing nut such as described which may be easily and inexpensively made from a small piece or strip of sheet metal and will be comparatively light as to weight yet strong and durable and characterized by a reliable self-locking action so as to effectively resist loosening under vibration.

A further object of this invention is to provide a self-locking wing nut such as described in which the particular manner of forming the integral wings on the sheet metal plate-like body of the nut, which body may be initially outwardly bowed to increase the spring action of the nut, causes said body to be so stressed that the nut is strengthened and has an increased spring locking action against the bolt or like fastening to which it is applied.

Another object is to provide a wing nut which constitutes an improvement in the art by reason of a construction such that the nut may be cheaply and easily made from a single rectangular strip of sheet or strap metal and will be considerably lighter than the conventional wing nut and at the same time as effective and subject to being easily die stamped to form in the body portion thereof a suitable means for threadedly engaging a bolt or like fastening.

With the foregoing objects in view, together with such other objects and advantages as may subsequently appear, the invention resides in the parts and in the combination, construction and arrangements of parts hereinafter described and claimed, and illustrated by way of example in the accompanying drawing, in which:

Figure 1:
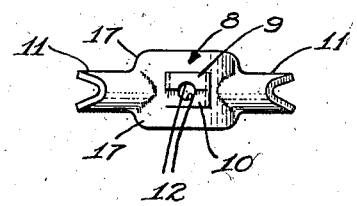
Fig. 1 is a top plan view of a wing nut embodying the present invention.

Referring more specifically to the drawing, it will be seen that a wing nut embodying my invention is made from a strip or elongated piece of resilient sheet metal stamped or otherwise treated to form a substantially rectangular body portion 8, laterally juxtaposed elongated resilient arch portions 9 and 10 integral at their ends with said body portion, and wings or finger gripping portions 11 inclined upwardly and outwardly from opposite ends of said body portion.

The arch portions 9 and 10 lie for the most part in outwardly offset relation to the body portion and are provided at points between their ends with opposed arcuate side edge portions 12 which define an opening for reception of a bolt or like member 13. In order that the edge portions 12 be properly angularly disposed for threadedly engaging the threads of the bolt, the arch portions 9 and 10 are oppositely inclined and one of them is outwardly offset a greater extent than the other.

Figure 3:
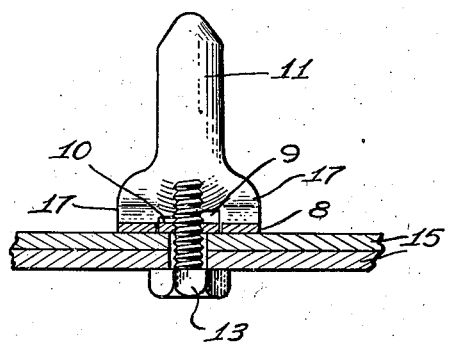
Fig. 3 is a sectional view showing how the nut is applied.

As here shown the arch portions 9 and 10 are spaced inwardly from the side and end margins of the body portion which latter forms a somewhat rectangular frame around the arch portions and is adapted to seat on one of the two members 15 through which the bolt is inserted, as shown in Fig. 3 to secure such members together.

The wings 11 are formed by bending the end portions of the strip of sheet metal of which the wing nut is formed, so that such end portions are channel shaped in cross section, with their convex sides uppermost as shown.

Figure 2:
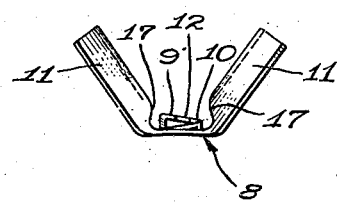
Fig. 2 is a side elevation of the wing nut.

In forming the wings to extend in outwardly and upwardly inclined relation to the body portion, upwardly and outwardly curved web or flange portions 17 are formed in the nut shown in Figs. 1 to 3. This bending and forming of the wings imposes stresses on the body portion such that the bridge or arch portions are stressed for an effective resilient and yielding engagement with the bolt, assuring a spring locking action such that the nut and bolt will not loosen under vibration.

If desired the body portion 8 may be preformed with an outward bow between the juncture points of the body portion and the wings so that on the contacting of such body portion with one of the members 15 as the bolt is tightened the spring action of the body portion will be brought into play to assist in the tight gripping of the bolt by the arches 9 and 10, thereby effectively locking the nut on the bolt.

It should be noted that wings 11, body portions 8 and arches 9 and 10 are constructed and relatively arranged in such manner that the entire nut is under spring tension when tightened on the bolt as shown in Fig. 3, thereby causing the edges 12 to bite into the bolt and lock the nut thereon in a most reliable manner. Moreover, the particular formation of the wings and body portion strengthens and reinforces the nut as a whole and adds rigidity while at the same time increasing the resilient locking action when the nut is tightened on the bolt.

The particular wing nut hereof is considerably lighter than wing nuts of the conventional type and more efficient in view of the self-locking action thereof and the fact that it has comparable strength and can be produced at a lower cost with a relatively small amount of cheaper metal.

It should also be noted that the wing nut hereof in being made from a single piece of sheet metal of uniform width and readily stamped and bent to form the body portion and the channelled wings, lends itself to a ready formation of any suitable arrangement of its body portion to provide for a threaded engagement of the nut with the bolt, and that such "threading" construction due to the resilience of the nut will have a self-locking action. Furthermore, the wings 11, which extend upwardly from the end portions of the nut, owing to being upwardly arched in cross section at the points where they join the base portion of the nut, are strongly united thereto and yet do not impair the resiliency of the nut body throughout its side edge portions, which portions are free to spring downwardly between their ends under the stress applied to them when the nut is screwed into place.

I claim:

1. In a wing nut, a resilient sheet metal body portion having outwardly struck arch portions formed with bolt-engaging side edge portions defining an opening through the body portion and disposed for threadedly engaging a bolt inserted through said opening, and wings formed integral with opposite end portions of said body portion inclined outwardly and upwardly therefrom, being formed by bending into channelled shape extensions of a rectangular piece of sheet metal of which the body portion is formed, the channels in said wings opening downwardly.

2. In a wing nut, a resilient sheet metal body portion having outwardly struck arch portions formed with bolt-engaging side edge portions defining an opening through the body portion and disposed for threadedly engaging a bolt inserted through said opening, and wings formed integral with opposite end portions of said body portion and inclined outwardly and upwardly therefrom, said wings being formed by bending into channelled shape extensions of the piece of sheet metal of which the body portion is formed, said body portion being outwardly bowed between the points where the wings are joined thereto, the channels in said wings opening downwardly and the opposite side portions of the body of the nut being free to spring downwardly under the stress applied to them when the nut is screwed into place.

3. In a wing nut, a plate-like body portion formed of a single piece of resilient sheet metal having extensions from opposite sides thereof doubled into channelled form upwardly arched in cross section where they join said body portion and bent to extend upwardly and outwardly as finger gripping wings, and means embodied in the body portion providing an opening therein and threadedly engaging a bolt or like threaded member turned in said opening, the opposite side portions of the nut body between said wings being freely deflectable under the stress applied to them when the nut is screwed into place.

LEONARD CARL BROSE.